United States Patent
Vieten et al.

(10) Patent No.: US 10,529,233 B1
(45) Date of Patent: Jan. 7, 2020

(54) VEHICLE AND METHOD FOR DETECTING A PARKING SPACE VIA A DRONE

(71) Applicant: Ford Global Technologies, LLC, Dearborn, MI (US)

(72) Inventors: Florian Vieten, Meerbusch (DE); Marc Roeber, Düsseldorf (DE); Patrick Hanneken, Dormagen (DE)

(73) Assignee: Ford Global Technologies LLC, Dearborn, MI (US)

( * ) Notice: Subject to any disclaimer, the term of this patent is extended or adjusted under 35 U.S.C. 154(b) by 0 days.

(21) Appl. No.: 16/139,488

(22) Filed: Sep. 24, 2018

(51) Int. Cl.
| | |
|---|---|
| *B60Q 1/48* | (2006.01) |
| *G08G 1/14* | (2006.01) |
| *G06K 9/00* | (2006.01) |
| *B64C 39/02* | (2006.01) |
| *G07C 5/00* | (2006.01) |

(52) U.S. Cl.
CPC ........... *G08G 1/143* (2013.01); *B64C 39/024* (2013.01); *G06K 9/00812* (2013.01); *G07C 5/008* (2013.01); *B64C 2201/123* (2013.01)

(58) Field of Classification Search
CPC ...... G08G 1/143; G07C 5/008; B64C 39/024; B64C 2201/123; G06K 9/00812
USPC ....................................................... 340/932.2
See application file for complete search history.

(56) References Cited

U.S. PATENT DOCUMENTS

| | | |
|---|---|---|
| 5,959,724 A | 9/1999 | Izumi |
| 6,275,754 B1 | 8/2001 | Shimizu |
| 6,356,828 B1 | 3/2002 | Shimizu |
| 6,452,617 B1 | 9/2002 | Bates |
| 6,476,730 B2 | 11/2002 | Kakinami |
| 6,477,260 B1 | 11/2002 | Shimomura |
| 6,657,555 B2 | 12/2003 | Shimizu |
| 6,683,539 B2 | 1/2004 | Trajkovic |
| 6,724,322 B2 | 4/2004 | Tang |
| 6,744,364 B2 | 6/2004 | Wathen |
| 6,768,420 B2 | 7/2004 | McCarthy |
| 6,801,855 B1 | 10/2004 | Walters |
| 6,850,844 B1 | 1/2005 | Walters |
| 6,850,148 B2 | 2/2005 | Masudaya |
| 6,927,685 B2 | 8/2005 | Wathen |
| 6,997,048 B2 | 2/2006 | Komatsu |
| 7,042,332 B2 | 5/2006 | Takamura |
| 7,123,167 B2 | 10/2006 | Staniszewski |

(Continued)

FOREIGN PATENT DOCUMENTS

| | | |
|---|---|---|
| CN | 101929921 A | 12/2010 |
| CN | 103818204 A | 5/2014 |

(Continued)

OTHER PUBLICATIONS

US 9,772,406 B2, 09/2017, Liu (withdrawn)

(Continued)

*Primary Examiner* — Tanmay K Shah
(74) *Attorney, Agent, or Firm* — Frank Lollo; Eversheds Sutherland (US) LLP

(57) ABSTRACT

A vehicle includes processors, a display, and a drone comprising a camera and sensors. The processors receive an input indicating a destination, generate a zone including the destination, cause the drone to capture images of the zone, identify an unoccupied parking spot from the images of the zone, and present the unoccupied parking spot on the display.

18 Claims, 4 Drawing Sheets

(56) References Cited

U.S. PATENT DOCUMENTS

| | | |
|---|---|---|
| 7,307,655 B1 | 12/2007 | Okamoto |
| 7,663,508 B2 | 2/2010 | Teshima |
| 7,737,866 B2 | 6/2010 | Wu |
| 7,813,844 B2 | 10/2010 | Gensler |
| 7,825,828 B2 | 11/2010 | Watanabe |
| 7,834,778 B2 | 11/2010 | Browne |
| 7,847,709 B2 | 12/2010 | McCall |
| 7,850,078 B2 | 12/2010 | Christenson |
| 7,924,483 B2 | 4/2011 | Smith |
| 8,035,503 B2 | 10/2011 | Partin |
| 8,054,169 B2 | 11/2011 | Bettecken |
| 8,098,146 B2 | 1/2012 | Petrucelli |
| 8,126,450 B2 | 2/2012 | Howarter |
| 8,164,628 B2 | 4/2012 | Stein |
| 8,180,524 B2 | 5/2012 | Eguchi |
| 8,180,547 B2 | 5/2012 | Prasad |
| 8,224,313 B2 | 7/2012 | Howarter |
| 8,229,645 B2 | 7/2012 | Lee |
| 8,242,884 B2 | 8/2012 | Holcomb |
| 8,335,598 B2 | 12/2012 | Dickerhoof |
| 8,401,235 B2 | 3/2013 | Lee |
| 8,493,236 B2 | 7/2013 | Boehme |
| 8,538,408 B2 | 9/2013 | Howarter |
| 8,542,130 B2 | 9/2013 | Lavoie |
| 8,552,856 B2 | 10/2013 | McRae |
| 8,587,681 B2 | 11/2013 | Guidash |
| 8,594,616 B2 | 11/2013 | Gusikhin |
| 8,599,043 B2 | 12/2013 | Kadowaki |
| 8,618,945 B2 | 12/2013 | Furuta |
| 8,645,015 B2 | 2/2014 | Oetiker |
| 8,655,551 B2 | 2/2014 | Danz |
| 8,692,773 B2 | 4/2014 | You |
| 8,706,350 B2 | 4/2014 | Talty |
| 8,725,315 B2 | 5/2014 | Talty |
| 8,742,947 B2 | 6/2014 | Nakazono |
| 8,744,684 B2 | 6/2014 | Hong |
| 8,780,257 B2 | 7/2014 | Gidon |
| 8,787,868 B2 | 7/2014 | Leblanc |
| 8,825,262 B2 | 9/2014 | Lee |
| 8,933,778 B2 | 1/2015 | Birkel |
| 8,957,786 B2 | 2/2015 | Stempnik |
| 8,994,548 B2 | 3/2015 | Gaboury |
| 8,995,914 B2 | 3/2015 | Nishidai |
| 9,008,860 B2 | 4/2015 | Waldock |
| 9,014,920 B1 | 4/2015 | Torres |
| 9,078,200 B2 | 7/2015 | Wuergler |
| 9,086,879 B2 | 7/2015 | Gautama |
| 9,141,503 B1 | 9/2015 | Chen |
| 9,147,065 B2 | 9/2015 | Lauer |
| 9,154,920 B2 | 10/2015 | O'Brien |
| 9,168,955 B2 | 10/2015 | Noh |
| 9,193,387 B2 | 11/2015 | Auer |
| 9,225,531 B2 | 12/2015 | Hachey |
| 9,230,439 B2 | 1/2016 | Boulay |
| 9,233,710 B2 | 1/2016 | Lavoie |
| 9,273,966 B2 | 3/2016 | Bartels |
| 9,275,208 B2 | 3/2016 | Protopapas |
| 9,283,960 B1 | 3/2016 | Lavoie |
| 9,286,803 B2 | 3/2016 | Tippelhofer |
| 9,302,675 B2 | 4/2016 | Schilling |
| 9,318,022 B2 | 4/2016 | Barth |
| 9,379,567 B2 | 6/2016 | Kracker |
| 9,381,859 B2 | 7/2016 | Nagata |
| 9,429,657 B2 | 8/2016 | Sidhu |
| 9,429,947 B1 | 8/2016 | Wengreen |
| 9,454,251 B1 | 9/2016 | Guihot |
| 9,469,247 B2 | 10/2016 | Juneja |
| 9,493,187 B2 | 11/2016 | Pilutti |
| 9,506,774 B2 | 11/2016 | Shutko |
| 9,511,799 B2 | 12/2016 | Lavoie |
| 9,522,675 B1 | 12/2016 | You |
| 9,529,519 B2 | 12/2016 | Blumenberg |
| 9,557,741 B1 | 1/2017 | Elie |
| 9,563,990 B2 | 2/2017 | Khan |
| 9,595,145 B2 | 3/2017 | Avery |
| 9,598,051 B2 | 3/2017 | Okada |
| 9,606,241 B2 | 3/2017 | Varoglu |
| 9,616,923 B2 | 4/2017 | Lavoie |
| 9,637,117 B1 | 5/2017 | Gusikhin |
| 9,651,655 B2 | 5/2017 | Feldman |
| 9,656,690 B2 | 5/2017 | Shen |
| 9,666,040 B2 | 5/2017 | Flaherty |
| 9,688,306 B2 | 6/2017 | McClain |
| 9,701,280 B2 | 7/2017 | Schussmann |
| 9,712,977 B2 | 7/2017 | Tu |
| 9,715,816 B1 | 7/2017 | Adler |
| 9,725,069 B2 | 8/2017 | Krishnan |
| 9,731,714 B2 | 8/2017 | Kiriya |
| 9,731,764 B2 | 8/2017 | Baek |
| 9,754,173 B2 | 9/2017 | Kim |
| 9,809,218 B2 | 11/2017 | Elie |
| 9,811,085 B1 | 11/2017 | Hayes |
| 9,842,444 B2 | 12/2017 | Van Wiemeersch |
| 9,845,070 B2 | 12/2017 | Petel |
| 9,846,431 B2 | 12/2017 | Petel |
| 9,914,333 B2 | 3/2018 | Shank |
| 9,921,743 B2 | 3/2018 | Bryant |
| 9,946,255 B2 | 4/2018 | Matters |
| 9,959,763 B2 | 5/2018 | Miller |
| 9,971,130 B1 | 5/2018 | Lin |
| 9,975,504 B2 | 5/2018 | Dalke |
| 10,019,001 B2 | 7/2018 | Dang Van Nhan |
| 10,032,276 B1 | 7/2018 | Liu |
| 10,040,482 B1 | 8/2018 | Jung |
| 10,043,076 B1 | 8/2018 | Zhang |
| 10,131,347 B2 | 11/2018 | Kim |
| 10,192,113 B1 | 1/2019 | Liu |
| 10,246,055 B2 | 4/2019 | Farges |
| 10,268,341 B2 | 4/2019 | Kocienda |
| 2003/0060972 A1 | 3/2003 | Kakinami |
| 2003/0098792 A1 | 5/2003 | Edwards |
| 2003/0133027 A1 | 7/2003 | Itoh |
| 2005/0030156 A1 | 2/2005 | Alfonso |
| 2005/0068450 A1 | 3/2005 | Steinberg |
| 2005/0099275 A1 | 5/2005 | Kamdar |
| 2006/0010961 A1 | 1/2006 | Gibson |
| 2006/0227010 A1 | 10/2006 | Berstis |
| 2006/0235590 A1 | 10/2006 | Bolourchi |
| 2007/0230944 A1 | 10/2007 | Georgiev |
| 2008/0027591 A1 | 1/2008 | Lenser |
| 2008/0154464 A1 | 6/2008 | Sasajima |
| 2008/0154613 A1 | 6/2008 | Haulick |
| 2008/0238643 A1 | 10/2008 | Malen |
| 2008/0306683 A1 | 12/2008 | Ando |
| 2009/0096753 A1 | 4/2009 | Lim |
| 2009/0098907 A1 | 4/2009 | Huntzicker |
| 2009/0115639 A1 | 5/2009 | Proefke |
| 2009/0125181 A1 | 5/2009 | Luke |
| 2009/0125311 A1 | 5/2009 | Haulick |
| 2009/0128315 A1 | 5/2009 | Griesser |
| 2009/0146813 A1 | 6/2009 | Nuno |
| 2009/0174574 A1 | 7/2009 | Endo |
| 2009/0241031 A1 | 9/2009 | Gamaley |
| 2009/0289813 A1 | 11/2009 | Kwiecinski |
| 2009/0309970 A1 | 12/2009 | Ishii |
| 2009/0313095 A1 | 12/2009 | Hurpin |
| 2010/0025942 A1 | 2/2010 | Mangaroo |
| 2010/0061564 A1 | 3/2010 | Clemow |
| 2010/0114471 A1 | 5/2010 | Sugiyama |
| 2010/0114488 A1 | 5/2010 | Khamharn |
| 2010/0136944 A1 | 6/2010 | Taylor |
| 2010/0152972 A1 | 6/2010 | Attard |
| 2010/0156672 A1 | 6/2010 | Yoo |
| 2010/0245277 A1 | 9/2010 | Nakao |
| 2010/0259420 A1 | 10/2010 | Von Rehyer |
| 2011/0071725 A1 | 3/2011 | Kleve |
| 2011/0082613 A1 | 4/2011 | Oetiker |
| 2011/0190972 A1 | 8/2011 | Timmons |
| 2011/0205088 A1 | 8/2011 | Baker |
| 2011/0253463 A1 | 10/2011 | Smith |
| 2011/0309922 A1 | 12/2011 | Ghabra |
| 2012/0007741 A1 | 1/2012 | Laffey |
| 2012/0072067 A1 | 3/2012 | Jecker |
| 2012/0083960 A1 | 4/2012 | Zhu |

(56) References Cited

U.S. PATENT DOCUMENTS

| | | |
|---|---|---|
| 2012/0173080 A1 | 7/2012 | Cluff |
| 2012/0176332 A1 | 7/2012 | Fujibayashi |
| 2012/0271500 A1 | 10/2012 | Tsimhoni |
| 2012/0303258 A1 | 11/2012 | Pampus |
| 2012/0323643 A1 | 12/2012 | Volz |
| 2012/0323700 A1 | 12/2012 | Aleksandrovich |
| 2013/0021171 A1 | 1/2013 | Hsu |
| 2013/0024202 A1 | 1/2013 | Harris |
| 2013/0043989 A1 | 2/2013 | Niemz |
| 2013/0073119 A1 | 3/2013 | Huger |
| 2013/0109342 A1 | 5/2013 | Welch |
| 2013/0110342 A1 | 5/2013 | Wuttke |
| 2013/0113936 A1 | 5/2013 | Cohen |
| 2013/0124061 A1 | 5/2013 | Khanafer |
| 2013/0145441 A1 | 6/2013 | Mujumdar |
| 2013/0211623 A1 | 8/2013 | Thompson |
| 2013/0231824 A1 | 9/2013 | Wilson |
| 2013/0289825 A1 | 10/2013 | Noh |
| 2013/0314502 A1 | 11/2013 | Urbach |
| 2013/0317944 A1 | 11/2013 | Huang |
| 2014/0052323 A1 | 2/2014 | Reichel |
| 2014/0095994 A1 | 4/2014 | Kim |
| 2014/0096051 A1 | 4/2014 | Boblett |
| 2014/0121930 A1 | 5/2014 | Allexi |
| 2014/0147032 A1 | 5/2014 | Yous |
| 2014/0156107 A1 | 6/2014 | Karasawa |
| 2014/0188339 A1 | 7/2014 | Moon |
| 2014/0222252 A1 | 8/2014 | Matters |
| 2014/0240502 A1 | 8/2014 | Strauss |
| 2014/0282931 A1 | 9/2014 | Protopapas |
| 2014/0297120 A1 | 10/2014 | Cotgrove |
| 2014/0300504 A1 | 10/2014 | Shaffer |
| 2014/0303839 A1 | 10/2014 | Filev |
| 2014/0320318 A1 | 10/2014 | Victor |
| 2014/0327736 A1 | 11/2014 | DeJohn |
| 2014/0350804 A1 | 11/2014 | Park |
| 2014/0350855 A1 | 11/2014 | Vishnuvajhala |
| 2014/0365108 A1 | 12/2014 | You |
| 2014/0365126 A1 | 12/2014 | Vulcano |
| 2015/0022468 A1 | 1/2015 | Cha |
| 2015/0039173 A1 | 2/2015 | Beaurepaire |
| 2015/0039224 A1 | 2/2015 | Tuukkanen |
| 2015/0048927 A1 | 2/2015 | Simmons |
| 2015/0066545 A1 | 3/2015 | Kotecha |
| 2015/0077522 A1 | 3/2015 | Suzuki |
| 2015/0088360 A1 | 3/2015 | Bonnet |
| 2015/0091741 A1 | 4/2015 | Stefik |
| 2015/0109116 A1 | 4/2015 | Grimm |
| 2015/0116079 A1 | 4/2015 | Mishra |
| 2015/0123818 A1 | 5/2015 | Sellschopp |
| 2015/0127208 A1 | 5/2015 | Jecker |
| 2015/0149265 A1 | 5/2015 | Huntzicker |
| 2015/0151789 A1 | 6/2015 | Lee |
| 2015/0153178 A1 | 6/2015 | Koo |
| 2015/0161890 A1 | 6/2015 | Huntzicker |
| 2015/0163649 A1 | 6/2015 | Chen |
| 2015/0197278 A1 | 7/2015 | Boos |
| 2015/0203111 A1 | 7/2015 | Bonnet |
| 2015/0203156 A1 | 7/2015 | Hafner |
| 2015/0210317 A1 | 7/2015 | Hafner |
| 2015/0217693 A1 | 8/2015 | Pliefke |
| 2015/0219464 A1 | 8/2015 | Beaurepaire |
| 2015/0220791 A1 | 8/2015 | Wu |
| 2015/0226146 A1 | 8/2015 | Elwart |
| 2015/0274016 A1 | 10/2015 | Kinoshita |
| 2015/0286340 A1 | 10/2015 | Send |
| 2015/0329110 A1 | 11/2015 | Stefan |
| 2015/0344028 A1 | 12/2015 | Gieseke |
| 2015/0346727 A1 | 12/2015 | Ramanujam |
| 2015/0360720 A1 | 12/2015 | Li |
| 2015/0365401 A1 | 12/2015 | Brown |
| 2015/0371541 A1 | 12/2015 | Korman |
| 2015/0375741 A1 | 12/2015 | Kiriya |
| 2015/0375742 A1 | 12/2015 | Gebert |
| 2016/0012653 A1 | 1/2016 | Soroka |
| 2016/0012726 A1 | 1/2016 | Wang |
| 2016/0018821 A1 | 1/2016 | Akita |
| 2016/0055749 A1 | 2/2016 | Nicoll |
| 2016/0153778 A1 | 2/2016 | Singh |
| 2016/0062354 A1 | 3/2016 | Li |
| 2016/0068158 A1 | 3/2016 | Elwart |
| 2016/0068187 A1 | 3/2016 | Hata |
| 2016/0075369 A1 | 3/2016 | Lavoie |
| 2016/0090055 A1 | 3/2016 | Breed |
| 2016/0107689 A1 | 4/2016 | Lee |
| 2016/0112846 A1 | 4/2016 | Siswick |
| 2016/0114726 A1 | 4/2016 | Nagata |
| 2016/0117926 A1 | 4/2016 | Akavaram |
| 2016/0127664 A1 | 5/2016 | Bruder |
| 2016/0139244 A1 | 5/2016 | Holtman |
| 2016/0144857 A1 | 5/2016 | Ohshima |
| 2016/0152263 A1 | 6/2016 | Singh |
| 2016/0170494 A1 | 6/2016 | Bonnet |
| 2016/0185389 A1 | 6/2016 | Ishijima |
| 2016/0189435 A1 | 6/2016 | Beaurepaire |
| 2016/0207528 A1 | 7/2016 | Stefan |
| 2016/0224025 A1 | 8/2016 | Petel |
| 2016/0229452 A1 | 8/2016 | Lavoie |
| 2016/0236680 A1 | 8/2016 | Lavoie |
| 2016/0249294 A1 | 8/2016 | Lee |
| 2016/0257304 A1 | 9/2016 | Lavoie |
| 2016/0272244 A1 | 9/2016 | Imai |
| 2016/0282442 A1 | 9/2016 | O'Mahony |
| 2016/0284217 A1 | 9/2016 | Lee |
| 2016/0288657 A1 | 10/2016 | Tokura |
| 2016/0300417 A1 | 10/2016 | Hatton |
| 2016/0304087 A1 | 10/2016 | Noh |
| 2016/0304088 A1 | 10/2016 | Barth |
| 2016/0349362 A1 | 10/2016 | Rohr |
| 2016/0321445 A1 | 11/2016 | Turgeman |
| 2016/0321926 A1 | 11/2016 | Mayer |
| 2016/0334797 A1 | 11/2016 | Ross |
| 2016/0347280 A1 | 12/2016 | Daman |
| 2016/0355125 A1 | 12/2016 | Herbert |
| 2016/0357354 A1 | 12/2016 | Chen |
| 2016/0358474 A1 | 12/2016 | Uppal |
| 2016/0368489 A1 | 12/2016 | Aich |
| 2016/0371607 A1 | 12/2016 | Rosen |
| 2016/0371691 A1 | 12/2016 | Kang |
| 2017/0001650 A1 | 1/2017 | Park |
| 2017/0008563 A1 | 1/2017 | Popken |
| 2017/0026198 A1 | 1/2017 | Ochiai |
| 2017/0028985 A1 | 2/2017 | Kiyokawa |
| 2017/0030722 A1 | 2/2017 | Kojo |
| 2017/0032593 A1 | 2/2017 | Patel |
| 2017/0072947 A1 | 3/2017 | Lavoie |
| 2017/0073004 A1 | 3/2017 | Shepard |
| 2017/0076603 A1 | 3/2017 | Bostick |
| 2017/0097504 A1 | 4/2017 | Takamatsu |
| 2017/0116790 A1 | 4/2017 | Kusens |
| 2017/0123423 A1 | 5/2017 | Sako |
| 2017/0129537 A1 | 5/2017 | Kim |
| 2017/0129538 A1 | 5/2017 | Stefan |
| 2017/0132482 A1 | 5/2017 | Kim |
| 2017/0144654 A1 | 5/2017 | Sham |
| 2017/0144656 A1 | 5/2017 | Kim |
| 2017/0147995 A1 | 5/2017 | Kalimi |
| 2017/0168479 A1 | 6/2017 | Dang |
| 2017/0192428 A1 | 7/2017 | Vogt |
| 2017/0200369 A1 | 7/2017 | Miller |
| 2017/0203763 A1 | 7/2017 | Yamada |
| 2017/0208438 A1 | 7/2017 | Dickow |
| 2017/0297385 A1 | 10/2017 | Kim |
| 2017/0297620 A1 | 10/2017 | Lavoie |
| 2017/0301241 A1 | 10/2017 | Urhahne |
| 2017/0308075 A1 | 10/2017 | Whitaker |
| 2017/0336788 A1 | 11/2017 | Iagnemma |
| 2017/0357317 A1 | 12/2017 | Chaudhri |
| 2017/0371514 A1 | 12/2017 | Cullin |
| 2018/0015878 A1 | 1/2018 | McNew |
| 2018/0024559 A1 | 1/2018 | Seo |
| 2018/0029591 A1 | 2/2018 | Lavoie |
| 2018/0029641 A1 | 2/2018 | Solar |
| 2018/0039264 A1 | 2/2018 | Messner |

(56) References Cited

U.S. PATENT DOCUMENTS

| | | |
|---|---|---|
| 2018/0043884 A1 | 2/2018 | Johnson |
| 2018/0056939 A1 | 3/2018 | van Roermund |
| 2018/0056989 A1 | 3/2018 | Donald |
| 2018/0082588 A1 | 3/2018 | Hoffman, Jr. |
| 2018/0088330 A1 | 3/2018 | Giannuzzi |
| 2018/0093663 A1 | 4/2018 | Kim |
| 2018/0105165 A1 | 4/2018 | Alarcon |
| 2018/0105167 A1 | 4/2018 | Kim |
| 2018/0148094 A1 | 5/2018 | Mukaiyama |
| 2018/0174460 A1 | 6/2018 | Jung |
| 2018/0189971 A1 | 7/2018 | Hildreth |
| 2018/0194344 A1 | 7/2018 | Wang |
| 2018/0196963 A1 | 7/2018 | Bandiwdekar |
| 2018/0224863 A1 | 8/2018 | Fu |
| 2018/0236957 A1 | 8/2018 | Min |
| 2018/0284802 A1 | 10/2018 | Tsai |
| 2018/0286072 A1 | 10/2018 | Tsai |
| 2018/0339654 A1 | 11/2018 | Kim |
| 2018/0345851 A1 | 12/2018 | Lavoie |
| 2018/0364731 A1 | 12/2018 | Liu |
| 2019/0005445 A1 | 1/2019 | Bahrainwala |
| 2019/0042003 A1* | 2/2019 | Parazynski ............ G06F 3/0346 |
| 2019/0066503 A1* | 2/2019 | Li ........................... B60W 30/06 |
| 2019/0103027 A1 | 4/2019 | Wheeler |
| 2019/0137990 A1 | 5/2019 | Golgiri |

FOREIGN PATENT DOCUMENTS

| | | |
|---|---|---|
| CN | 104183153 A | 12/2014 |
| CN | 104485013 A | 4/2015 |
| CN | 104691544 A | 6/2015 |
| CN | 103049159 B | 7/2015 |
| CN | 105513412 A | 4/2016 |
| CN | 105588563 A | 5/2016 |
| CN | 105599703 A | 5/2016 |
| CN | 105774691 A | 7/2016 |
| CN | 106027749 A | 10/2016 |
| CN | 205719000 U | 11/2016 |
| CN | 106598630 A | 4/2017 |
| CN | 106782572 A | 5/2017 |
| CN | 106945662 A | 7/2017 |
| CN | 104290751 B | 1/2018 |
| DE | 3844340 A1 | 7/1990 |
| DE | 19817142 A1 | 10/1999 |
| DE | 19821163 A1 | 11/1999 |
| DE | 102005006966 A1 | 9/2005 |
| DE | 102006058213 A1 | 7/2008 |
| DE | 102009024083 A1 | 7/2010 |
| DE | 102016224529 A1 | 3/2011 |
| DE | 102016226008 A1 | 3/2011 |
| DE | 102010034129 B4 | 2/2012 |
| DE | 102009060169 A1 | 6/2013 |
| DE | 102011080148 A1 | 7/2013 |
| DE | 102012200725 A1 | 9/2013 |
| DE | 102009051055 A1 | 10/2013 |
| DE | 102011122421 A1 | 6/2014 |
| DE | 102012008858 A1 | 6/2014 |
| DE | 102013016342 A1 | 1/2015 |
| DE | 102013019904 A1 | 2/2015 |
| DE | 102012215218 A1 | 4/2015 |
| DE | 102012222972 A1 | 5/2015 |
| DE | 102013004214 A1 | 5/2015 |
| DE | 102013019771 A1 | 12/2015 |
| DE | 102013213064 A1 | 2/2016 |
| DE | 102014007915 A1 | 2/2016 |
| DE | 102014011802 A1 | 2/2016 |
| DE | 102014009077 A1 | 4/2016 |
| DE | 102014226458 A1 | 6/2016 |
| DE | 102014011864 A1 | 12/2016 |
| DE | 102014015655 A1 | 5/2017 |
| DE | 102014111570 A1 | 6/2017 |
| DE | 102016214433 A1 | 6/2017 |
| DE | 102015209976 A1 | 7/2017 |
| DE | 102015221224 A1 | 12/2017 |
| DE | 102016011916 A1 | 2/2018 |
| DE | 102016125282 A1 | 6/2018 |
| DE | 102016211021 A1 | 6/2018 |
| EP | 2653367 A1 | 6/2000 |
| EP | 2768718 B1 | 6/2011 |
| EP | 2289768 A2 | 10/2013 |
| EP | 2620351 B1 | 12/2015 |
| EP | 2295281 A1 | 3/2016 |
| EP | 2135788 B1 | 6/2016 |
| FR | 3021798 A1 | 12/2012 |
| GB | 2534471 A | 10/2000 |
| GB | 2344481 A | 12/2012 |
| GB | 2497836 A | 9/2014 |
| GB | 2481324 A | 3/2015 |
| GB | 2517835 A | 5/2016 |
| GB | 2491720 A | 7/2016 |
| JP | 5586450 B2 | 5/2004 |
| JP | 5918683 B2 | 10/2004 |
| JP | 2000293797 A | 7/2005 |
| JP | 2004142543 A | 4/2009 |
| JP | 2016119032 A | 4/2009 |
| JP | 2018052188 A | 1/2010 |
| JP | 2004287884 A | 7/2014 |
| JP | 2005193742 A | 7/2014 |
| JP | 2009090850 A | 6/2016 |
| JP | 2014134082 A | 7/2016 |
| JP | 2014125196 A | 4/2018 |
| KR | 20130106005 A | 6/2006 |
| KR | 20160039460 A | 5/2008 |
| KR | 20160051993 A | 1/2010 |
| KR | 101641267 B | 9/2013 |
| KR | 20090040024 A | 4/2016 |
| KR | 20100006714 A | 5/2016 |
| WO | WO 2017/112444 A1 | 12/2010 |
| WO | WO 2017/118510 A1 | 6/2011 |
| WO | WO 2006/064544 A1 | 11/2011 |
| WO | WO 2017/125514 A1 | 1/2013 |
| WO | WO 2008/055567 A1 | 4/2013 |
| WO | WO 2010/006981 A1 | 8/2013 |
| WO | WO 2011/141096 A1 | 7/2014 |
| WO | WO 2013/056959 A1 | 5/2015 |
| WO | WO 2013/123813 A1 | 12/2015 |
| WO | WO 2014/103492 A1 | 3/2016 |
| WO | WO 2015/068032 A1 | 8/2016 |
| WO | WO 2015/193058 A1 | 9/2016 |
| WO | WO 2016/046269 A1 | 4/2017 |
| WO | WO 2016/128200 A1 | 5/2017 |
| WO | WO 2016/134822 A1 | 6/2017 |
| WO | WO 2017/062448 A1 | 6/2017 |
| WO | WO 2017/073159 A1 | 6/2017 |
| WO | WO 2017/096307 A1 | 6/2017 |
| WO | WO 2017/096728 A1 | 7/2017 |
| WO | WO 2017/097942 A1 | 7/2017 |

OTHER PUBLICATIONS

Alberto Broggi and Elena Cardarelli, Vehicle Detection for Autonomous Parking Using a Soft-Cascade ADA Boost Classifier, Jun. 8, 2014.

Al-Sherbaz, Ali et al., Hybridisation of GNSS with other wireless/sensors technologies on board smartphones to offer seamless outdoors-indoors positioning for LBS applications, Apr. 2016, 3 pages.

Automatically Into the Parking Space—https://www.mercedes-benz.com/en/mercedes-benz/next/automation/automatically-into-the-parking-space/; Oct. 27, 2014.

Bill Howard, Bosch's View of the Future Car: Truly Keyless Entry, Haptic Feedback, Smart Parking, Cybersecurity, Jan. 9, 2017, 8 Pages.

ChargeItSpot Locations, Find a Phone Charging Station Near You, retrieved at https://chargeitspot.com/locations/ on Nov. 28, 2017.

Core System Requirements Specification (SyRS), Jun. 30, 2011, Research and Innovative Technology Administration.

Daimler AG, Remote Parking Pilot, Mar. 2016 (3 Pages).

Jingbin Liu, IParking: An Intelligent Indoor Location-Based Smartphone Parking Service, Oct. 31, 2012, 15 pages.

Land Rover develops a smartphone remote control for its SUVs, James Vincent, Jun. 18, 2015.

(56) References Cited

OTHER PUBLICATIONS

Land Rover, Land Rover Remote Control via Iphone RC Range Rover Sport Showcase—Autogefühl, Retrieved from https://www.youtube.com/watch?v=4ZaaYNaEFio (at 43 seconds and 1 minute 42 seconds), Sep. 16, 2015.
Perpendicular Parking—https://prezi.com/toqmfyxriksl/perpendicular-parking/.
SafeCharge, Secure Cell Phone Charging Stations & Lockers, retrieved at https://www.thesafecharge.com on Nov. 28, 2017.
Search Report dated Jan. 19, 2018 for GB Patent Application No. 1711988.4 (3 pages).
Search Report dated Jul. 11, 2017 for GB Patent Application No. 1700447.4 (3 Pages).
Search Report dated May 21, 2018 for Great Britain Patent Application No. GB 1800277.4 (5 Pages).
Search Report dated Nov. 22, 2018 for GB Patent Application No. GB 1809829.3 (6 pages).
Search Report dated Nov. 27, 2018 for GB Patent Application No. GB 1809112.4 (3 pages).
Search Report dated Nov. 28, 2017, for GB Patent Application No. GB 1710916.6 (4 Pages).
Search Report dated Nov. 28, 2018 for GB Patent Application No. GB 1809842.6 (5 pages).
Search Report dated Oct. 10, 2018 for GB Patent Application No. 1806499.8 (4 pages).
Tesla Model S Owner's Manual v2018.44. Oct. 29, 2018.
Vehicle's Orientation Measurement Method by Single-Camera Image Using Known-Shaped Planar Object, Nozomu Araki, Takao Sato, Yasuo Konishi and Hiroyuki Ishigaki, 2010.

\* cited by examiner

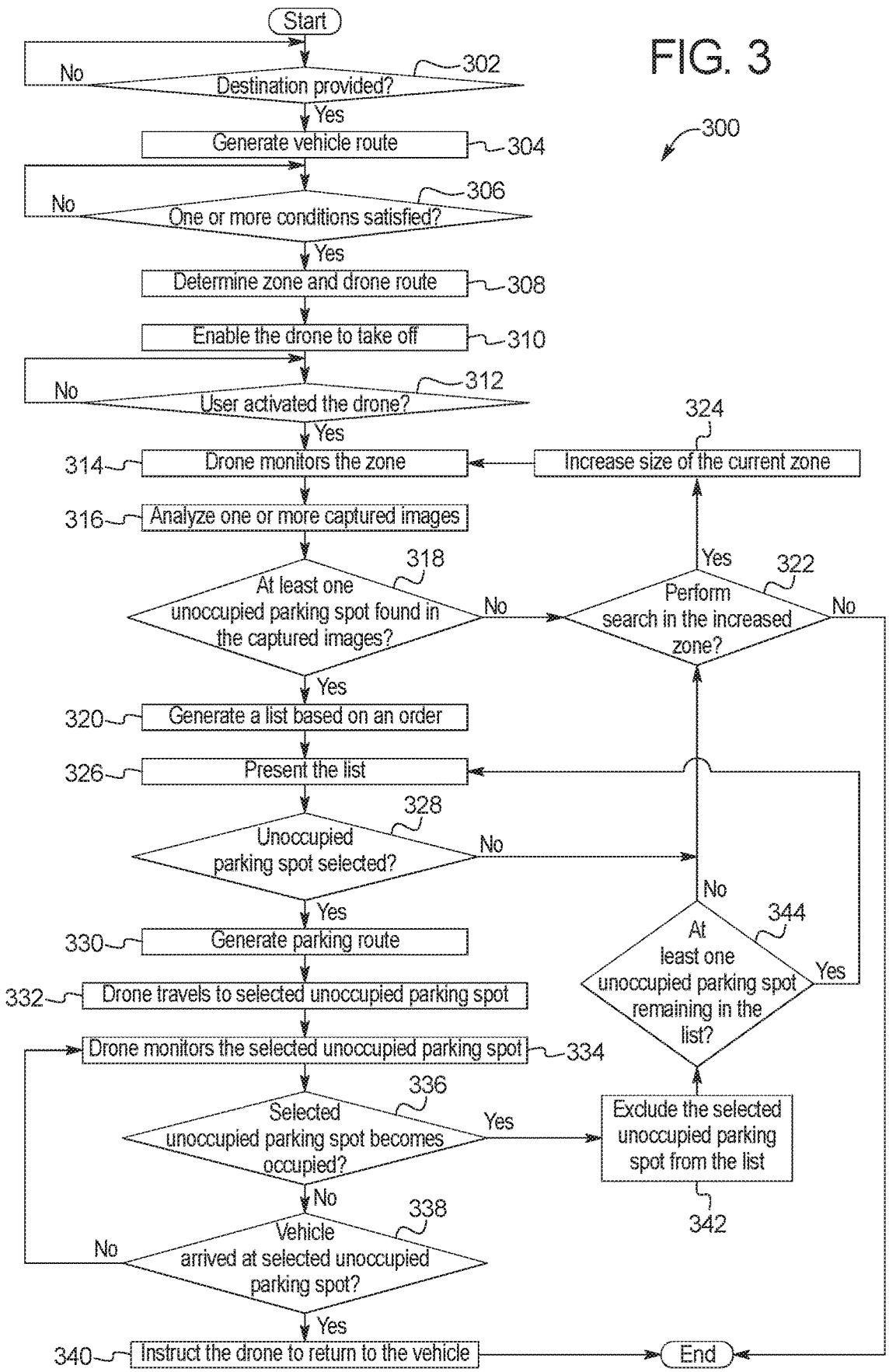

VEHICLE AND METHOD FOR DETECTING
A PARKING SPACE VIA A DRONE

TECHNICAL FIELD

The present disclosure generally relates to vehicles and methods for detecting a parking space via a drone and, more specifically, vehicles and methods for detecting an unoccupied parking space and monitoring the same via a drone.

BACKGROUND

Drivers typically spend a considerable amount of time, fuel consumption, and emissions to find a parking spot. Studies show that each American spends an average of 17 hours per year searching for parking, costing the U.S. economy more than 72 billion dollars annually in wasted time, fuel and emissions. In urban U.S. cities, such as New York city, a driver spends an average of 107 hours annually to find parking. It may be desirable for vehicles to include a feature for reducing the amount of time to search for a suitable parking spot.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example vehicle and method are disclosed. An example vehicle includes a drone comprising a camera and sensors. The vehicle further includes a display and processors to receive an input indicating a destination, generate a zone including the destination, cause the drone to capture images of the zone, identify an unoccupied parking spot from the images of the zone, and present the unoccupied parking spot on the display.

An example method of operating a drone to identify at least one unoccupied parking spot for a vehicle includes receiving an input indicating a destination, generating a zone including the destination, causing the drone to capture images of the zone, identifying an unoccupied parking spot from the images of the zone, displaying the unoccupied parking spot.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 3 illustrates an example flowchart of a method for operating a park assist controller and a drone of the vehicle of FIG. 1.

DETAILED DESCRIPTION OF EXAMPLE EMBODIMENTS

Figure 1:
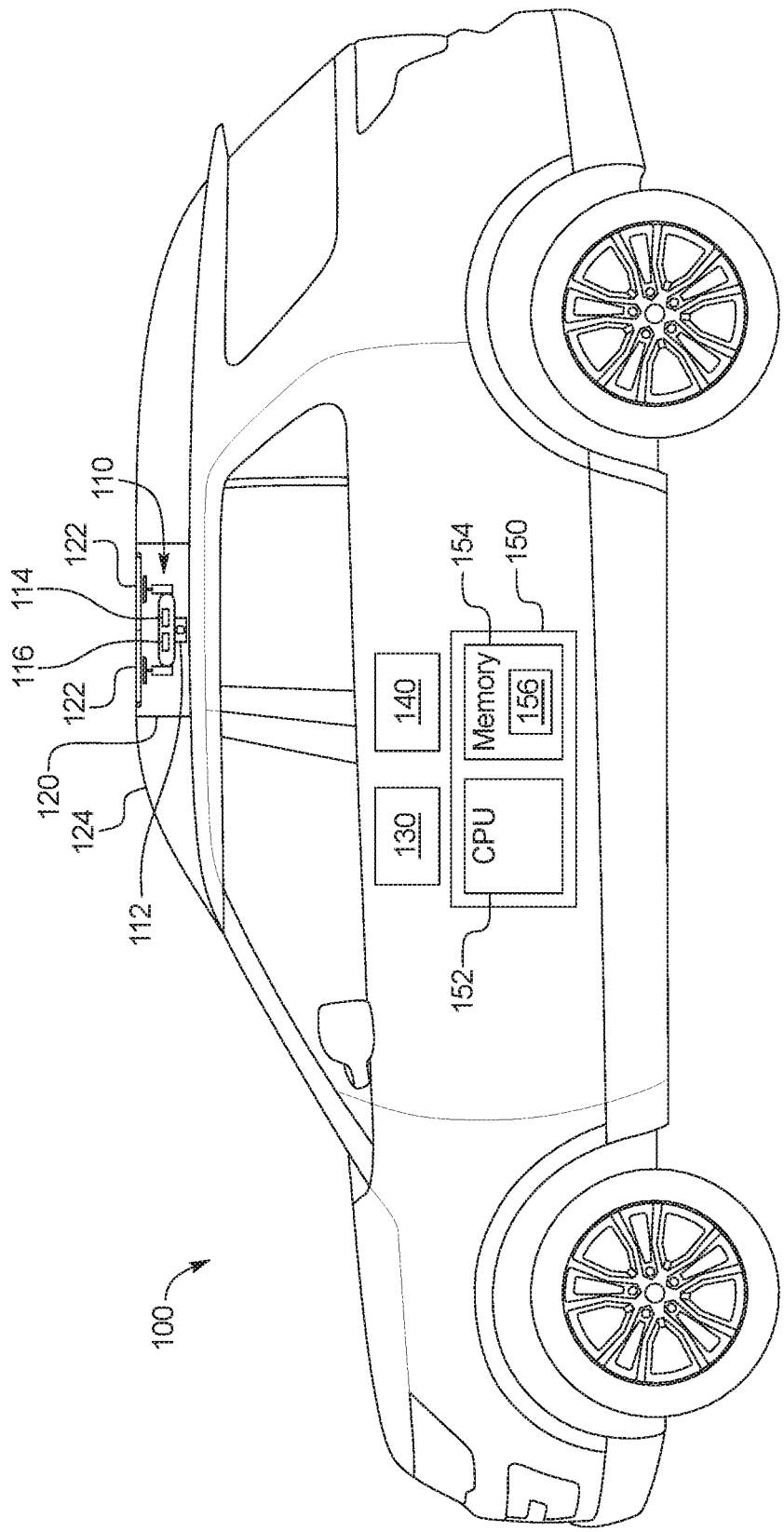
FIG. 1. illustrates an example vehicle in accordance with the teachings herein.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

An example vehicle described herein includes a drone including at least camera for searching for an unoccupied parking spot within or proximate to a destination selected by a user. The drone may be automatically activated or manually activated via a user interface prior to the vehicle's arrival at the destination. Upon activation, the vehicle uses the drone to find an unoccupied parking spot within a zone including the destination. In one example, the drone captures and transmits to the vehicle images of areas within the zone, and the vehicle identifies one or more unoccupied parking spot based on the images. In another example, the drone identifies one or more unoccupied parking spot within the zone and transmits such information to the vehicle. If at least one unoccupied parking spot is identified within the zone, such information is presented to the user via a user interface. If no unoccupied parking spot is identified within the zone, the zone may be increased and the user may choose to instruct the drone to seek for an unoccupied parking spot within the increased zone.

Hereinafter, the terminology "drone" will be construed as a unmanned aerial vehicle (UAV).

FIG. 1. illustrates an example vehicle in accordance with the teachings herein.

The vehicle 100 may be a standard gasoline powered vehicle, a hybrid vehicle, an electric vehicle, a fuel cell vehicle, and/or any other mobility implement type of vehicle. The vehicle includes parts related to mobility, such as a powertrain with an engine, a transmission, a suspension, a driveshaft, and/or wheels, etc. The vehicle 100 may be semi-autonomous (e.g., some routine motive functions controlled by the vehicle) or autonomous (e.g., motive functions are controlled by the vehicle without direct driver input). The vehicle 100 includes a drone 110, a drone cargo 120, a cargo door 122, an infotainment head unit 130, an on-board communications platform 140, and an on-board computing platform 150. The infotainment head unit 130, the on-board communications platform 140, and the on-board computing platform 150 may be communicatively coupled wirelessly or via a communication/power bus (not illustrated).

The drone 110 includes a camera 112, a communication module 114, a power supply 116. The camera 112 may be a standard camera (e.g., a camera that captures images in the visible spectrum), an infrared camera, or a 360 degree camera. In some examples, the drone 110 may include more than one camera. The communication module 114 may be defined by at least one processor, at least one memory, and at least one antenna (not illustrated). The communication module 114 may establish communication with the on-board communication platform 140 via one or more communication protocol. The power supply 116 may be one or more rechargeable batteries. While not illustrated, it should be appreciated that the drone 110 may include one or more processors, sensors, motors, rotors, and other electronic/mechanical devices for rendering the drone 110 airborne and for navigational purposes.

In the illustrated example, the drone cargo 120 is positioned by a roof 124 of the vehicle 100. The drone cargo 120 may include a landing pad and a battery charger (not illustrated). The drone cargo 120 is mechanically attached to the cargo door 122. The cargo door provides access for the drone 110 to exit and enter the drone 110 cargo.

The infotainment head unit 130 provides an interface between the vehicle 100 and a user. The infotainment head unit 130 includes digital and/or analog interfaces (e.g., input devices and output devices) to receive input from and display information for the user(s). The input devices include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display (LCD), an organic light emitting diode (OLED) display, a flat panel display, a solid state display, etc.), and/or speakers. The infotainment head unit 130 further may receive input signals from a mobile device communicatively coupled to the on-board communication platform. In the same manner, the infotainment head unit 130 may further output signals to the mobile device. In the illustrated example, the infotainment head unit 130 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.).

The on-board communications platform 140 includes wired or wireless network interfaces to enable communication with the drone 110, wireless devices such as mobile devices, other vehicles, and external networks. The on-board communications platform 140 also includes hardware (e.g., processors, memory, storage, antenna, etc.) and software to control the wired or wireless network interfaces. The on-board communications platform 140 includes one or more communication controllers (not illustrated) for cellular networks (e.g., Global System for Mobile Communications (GSM), Universal Mobile Telecommunications System (UMTS), Long Term Evolution (LTE), Code Division Multiple Access (CDMA)), Near Field Communication (NFC) and/or other standards-based networks (e.g., WiMAX (IEEE 802.16m); Near Field Communication (NFC), local area wireless network (including IEEE 802.11 a/b/g/n/ac or others), Wireless Gigabit (IEEE 802.11ad), 5G Network, etc.). In some examples, the on-board communications platform 140 includes a wired or wireless interface (e.g., an auxiliary port, a Universal Serial Bus (USB) port, a Bluetooth® wireless node, etc.) to communicatively couple with a mobile device (e.g., a smart phone, a wearable, a smart watch, a tablet, etc.). In such examples, the vehicle 100 may communicate with the external network via the coupled mobile device. The external network(s) may be a public network, such as the Internet; a private network, such as an intranet; or combinations thereof, and may utilize a variety of networking protocols now available or later developed including, but not limited to, TCP/IP-based networking protocols. In some examples, the on-board communications platform 140 communicates with (e.g., transmits signal to, receives signals from) a global positioning system (GPS) to monitor the current location of the vehicle 100.

The on-board computing platform 150 includes at least one processor 152 and memory 154. The processor 152 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs). The memory 154 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 154 includes multiple kinds of memory, particularly volatile memory and non-volatile memory.

The memory 154 is computer readable media on which one or more sets of instructions, such as the software for operating the methods of the present disclosure, can be embedded. The instructions may embody one or more of the methods or logic as described herein. For example, the instructions reside completely, or at least partially, within any one or more of the memory, the computer readable medium, and/or within the processor during execution of the instructions.

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In the illustrated example, the memory 154 embodies a park assist controller 156. The memory 154 is operable with the processor 152 to execute one or more operations of the park assist controller 156. While the illustrated example shows that the park assist controller 156 is embodied within the memory 154, it should be appreciated that the park assist controller 156 may reside in any other computer-readable medium within the vehicle 100, the drone 110, or the combination thereof. While the illustrated example shows that the park assist controller 156 is operable with the processor 152, it should be appreciated that the park assist controller 156 is operable with any other computer processor within the vehicle 100, the drone 110, or the combination thereof. The park assist controller 156 performs operations related to controlling the drone 110 to find at least one unoccupied parking spot within or proximate to a user-selected destination. Operations of the park assist controller 156 will be described in detail below.

At the outset, a user may provide an input indicating a desired destination via the infotainment head unit 130 or a mobile device communicatively coupled to the on-board communications platform 140. In response, the park assist controller 156 generates a route to the destination (hereinafter referred as vehicle route). The park assist controller 156 further enables the drone 110 to find at least one unoccupied parking spot within or proximate to the destination when one or more conditions are satisfied. In one of the conditions, the drone 110 is enabled when the vehicle's estimated time for arrival (ETA) to the destination is less than a threshold time. The threshold time accounts for the amount of power required for the drone 110 to: (1) reach the destination; (2) monitor one or more areas surrounding the destination; and (3) return to the vehicle. In some examples, the drone 110 may be enabled when the vehicle is within a predetermined distance from the destination. In some examples, the drone 110 may be enabled when a velocity of the vehicle is less than a threshold velocity. In such example, the threshold velocity accounts for drag force applied on the drone 110 during take-off. In some examples, the vehicle may: (1) include one or more sensors (e.g., rain sensor, temperature sensor, etc.) for detecting the weather; and/or (2) receive weather data via the on-board communications plat form, and the drone 110 may be enabled only when the one or more sensor and/or the weather data indicate a safe weather (e.g., no rain, wind velocity below a threshold, etc.). In one example, the park assist controller 156 may prompt the user for activating the drone 110 once the one or more conditions are satisfied. In another example, the park assist controller 156 may cause the drone 110 to automatically take-off once the one or more conditions are satisfied.

Further, the park assist controller 156 determines a zone in which the drone 110 is to monitor for at least one unoccupied parking spot. The zone includes the destination. The zone may be in a shape of a circle having the center thereof as the destination. The zone may be defined in any other geometric shapes. In some examples, the shape of the zone may be defined by streets and roads. In some examples, the shape of the zone may be defined such that the outermost edge of the zone is defined by a maximum walking distance to the destination. The park assist controller 156 further determines one or more routes in which the drone 110 is to traverse in order to find at least one unoccupied parking spot (hereinafter referred as drone 110 route). In some examples, the park assist controller 156 determines one or more drone 110 routes based on a priority. In such examples, the priority causes the drone 110 to prioritize a search within one area within the zone over other areas therein. For example, the park assist controller 156 may instruct the drone 110 to prioritize a search in an area within the zone based on proximity of the area relative to the vehicle route, i.e., the park assist controller 156 instructs the drone 110 to first search for an area that is within the zone and closest to the vehicle route and subsequently search for another area that is within the zone and second closest to vehicle route. In another example, the park assist controller 156 may instruct the drone 110 to prioritize a search in an area within the zone based on a type of parking spaces available therein (e.g., free parking spaces, paid parking spaces, permit parking spaces, etc.). In another example, the park assist controller 156 may instruct the drone 110 to prioritize a search in an area within the zone based on a degree of traffic therein. In another example, the park assist controller 156 may instruct the drone 110 to prioritize a search in an area within the zone based on the vehicle's ETA for each one or more areas. In some examples, the user may set the priority via the infotainment head unit 130 or the mobile device.

In one example, while the drone 110 is traversing one or more drone 110 routes, the drone 110 may transmit, to the vehicle, one or more images within the zone. In response, the park assist controller 156 identifies one or more unoccupied parking spots within the one or more images. In another example, as the drone 110 traverses the zone and captures images therein, the drone 110 may further identify one or more unoccupied parking spots based on the captured images and transmit such information to the vehicle 100. Subsequently, the park assist controller 156 generates a list including one or more unoccupied parking spots. In some examples, the park assist controller 156 sorts the list based on an order. For example, the order may be based on the proximity of each of the unoccupied parking spots within the list relative to the destination. In some examples, the order may be based on the vehicle's ETA to each of the unoccupied parking spots within the list. In some examples, the order may be based on a type of each unoccupied parking spot (e.g., free parking spaces, paid parking spaces, permit parking spaces). In some examples, the order may be based on a combination of one or more examples criteria set forth above. In some examples, the order may be configured based on the user's preference.

Subsequently, the park assist controller 156 presents the list to the user via the infotainment head unit 130 or the mobile device and enables the user to select an unoccupied parking spot from the list. In some examples, the park assist controller 156 automatically selects an unoccupied parking spot from the list.

Once an unoccupied parking spot is selected from the list, the park assist controller 156 automatically initiates, via the infotainment head unit 130 or the mobile device, the calculation of an updated route from the current position of the vehicle to the selected unoccupied parking spot.

Further, at this time, the drone 110 is instructed to monitor the selected unoccupied parking spot in order to verify that: (1) the selected unoccupied parking spot is an actual parking spot; (2) the selected unoccupied parking spot is unoccupied; (3) the selected unoccupied parking spot remains unoccupied. If at least one of these conditions are untrue, the park assist controller 156 removes the selected unoccupied parking spot from the list and enables the user to select another unoccupied parking spot from the list. If there is no remaining unoccupied parking spot within the list, the park assist controller 156 increases the zone and instructs the drone 110 to perform a search within the increased zone. The drone 110 may continue to monitor the selected unoccupied parking spot until the vehicle arrives at the selected unoccupied parking spot. In some examples, the vehicle may have a feature for automatically maneuvering the vehicle into the selected unoccupied parking spot. In such examples, the drone 110 facilitates such feature by monitoring details of an area surrounding the selected unoccupied parking spot.

If the park assist controller 156 fails to detect at least one unoccupied parking spot within the zone, or the user does not select an unoccupied parking spot from the list, the park assist controller 156 increases the zone and prompts the user whether a search for at least one unoccupied parking spot should be conducted within the increased zone. If the user accepts, the park assist controller 156 instructs the drone 110 to search for at least one unoccupied parking spot within the increased zone.

At any point during a period at which the drone 110 is searching for at least one unoccupied parking spot or monitoring a selected unoccupied parking spot, the drone 110 is programmed to return to the vehicle if: (1) the amount of the power left in the power supply 116 is merely enough for the drone 110 to return to the vehicle; or (2) the user instructs the drone 110 to return to the vehicle.

It should be appreciated that one or more of the operations of the park assist controller 156 may be performed by the drone 110. For example, such operations may include identifying one or more unoccupied parking spots within the zone, generating a list including the one or more unoccupied parking, sorting the list based on a priority, etc.

FIGS. 2A-D illustrate example displays of scenarios involving the vehicle of FIG. 1. The display 200 is provided on the infotainment head unit 130 or a mobile device communicatively coupled to the on-board communications platform 140. The display includes a first section 210 and a second section 250.

Figure 2A:
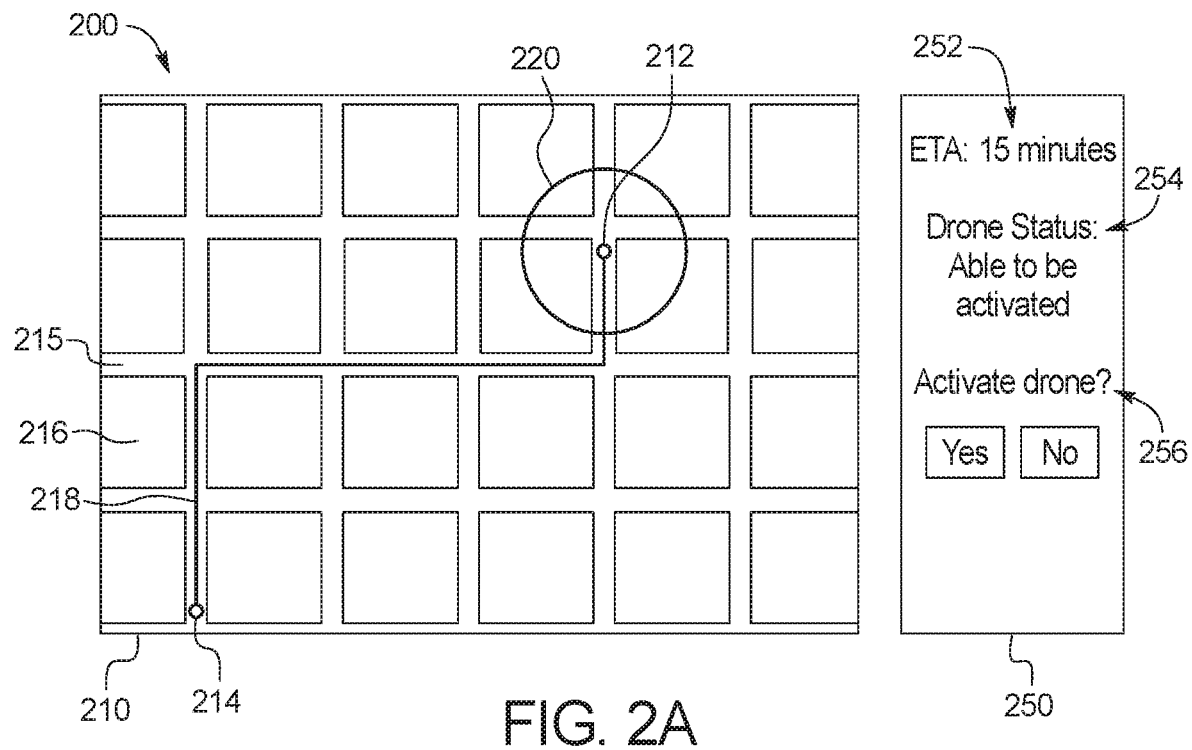
FIGS. 2A-D illustrate example displays of scenarios involving the vehicle of FIG. 1.

FIG. 2A illustrates an example display of a first example scenario. In the first scenario, the user has provided the destination 212 via the infotainment head unit 130 or the mobile device, and the drone 110 has not been activated.

The first section 210 displays a plan view of a map including the destination 212, the current position 214 of the vehicle 100, roads 215, non-drivable areas 216, the vehicle route 218, and the zone 220. While not illustrated, it should be appreciated that the map may include one or more markers indicating street names, traffic congestion, infrastructures, location labels, etc.

The second section 250 displays various information and prompts. In the illustrated example, the second section 250 includes an ETA 252 to the destination 212, a status 254 indicating availability of the drone 110, and a prompt 256 asking whether the user wishes to activate the drone 110. In some examples, the drone 110 may be automatically activated, and the second section 250 may display an indication of such activity. While not illustrated, it should be appreciated that the second section 250 may include information such as directions to the destination 212, weather information, etc.

Figure 2B:
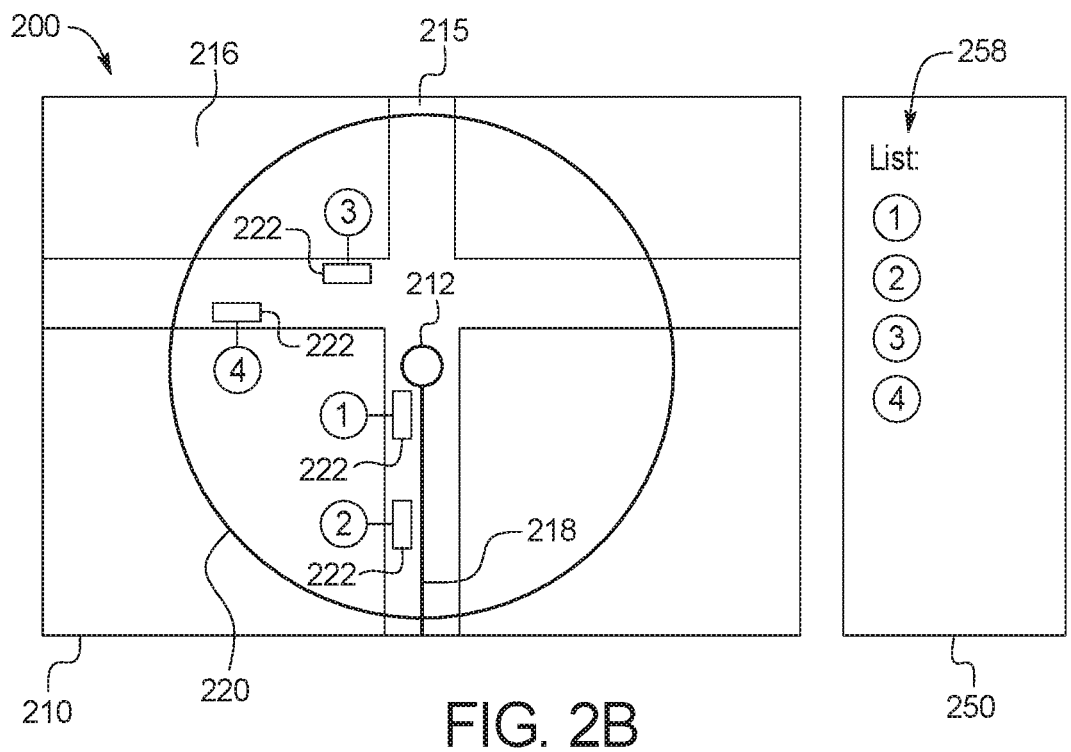

FIG. 2B illustrates an example display of a second example scenario. In the second scenario, the user has activated the drone 110, the drone 110 has captured one or more images of one or more areas within the zone 220, and the park assist controller 156 has identified a plurality of unoccupied parking spots 222.

In the illustrated example, the first section 210 displays a detailed view of the zone 220. The detailed view includes the destination 212, the roads 215, the non-drivable areas 216, the vehicle route 218, the zone 220, and the plurality of unoccupied parking spots 222.

Further, the second section 250 displays a list 258 including the plurality of unoccupied parking spots 222. The list 258 is sorted such that an unoccupied parking spot 222 proximate to the vehicle route 218 and closest to the destination 212 is provided as a first option.

Figure 2C:
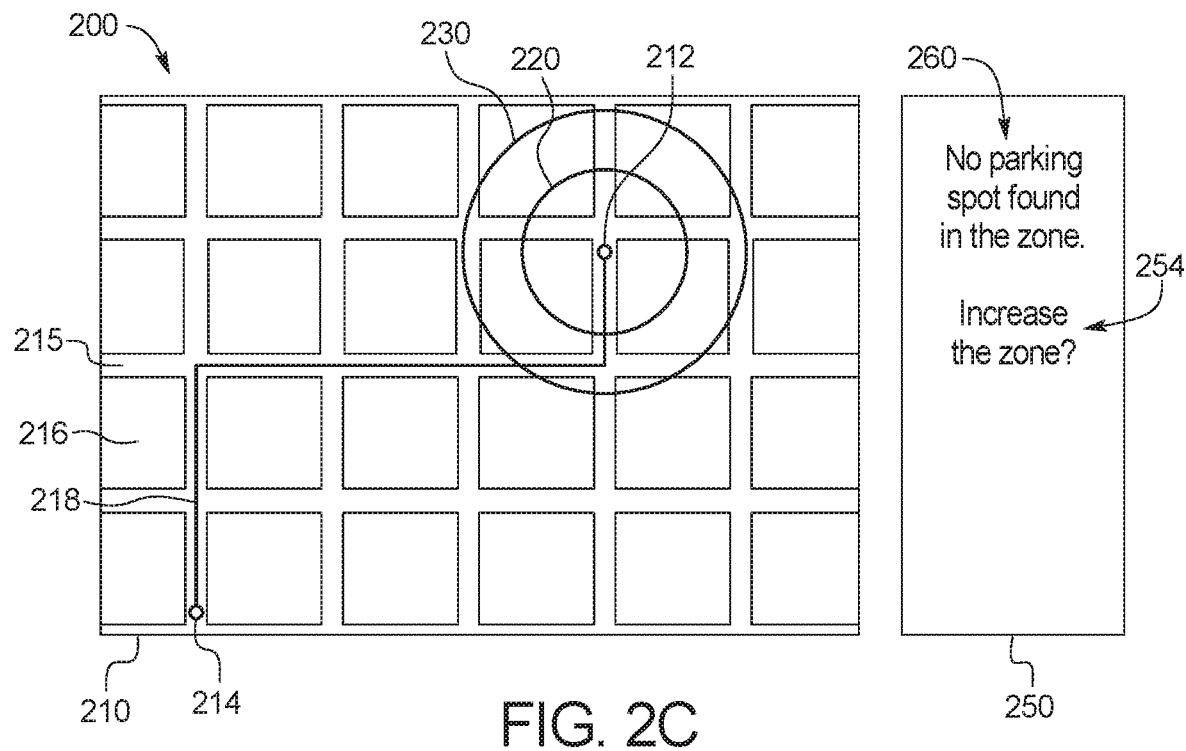

FIG. 2C illustrates an example display of a third example scenario. In the third scenario, the drone 110 has captured one or more images of one or more areas within the zone 220, and the park assist controller 156 has failed to identify any unoccupied parking spots within the zone 220.

In the illustrated example, the first section 210 displays a plan view of a map including the destination 212, the current position 214 of the vehicle 100, the roads 215, the non-drivable areas 216, the vehicle route 218, the zone 220, and the increased zone 230.

Further, the second section 250 displays information 260 indicating that no unoccupied parking spots has been detected within the zone 220 and a prompt 262 asking the user whether the zone 220 should be increased.

Figure 2D:
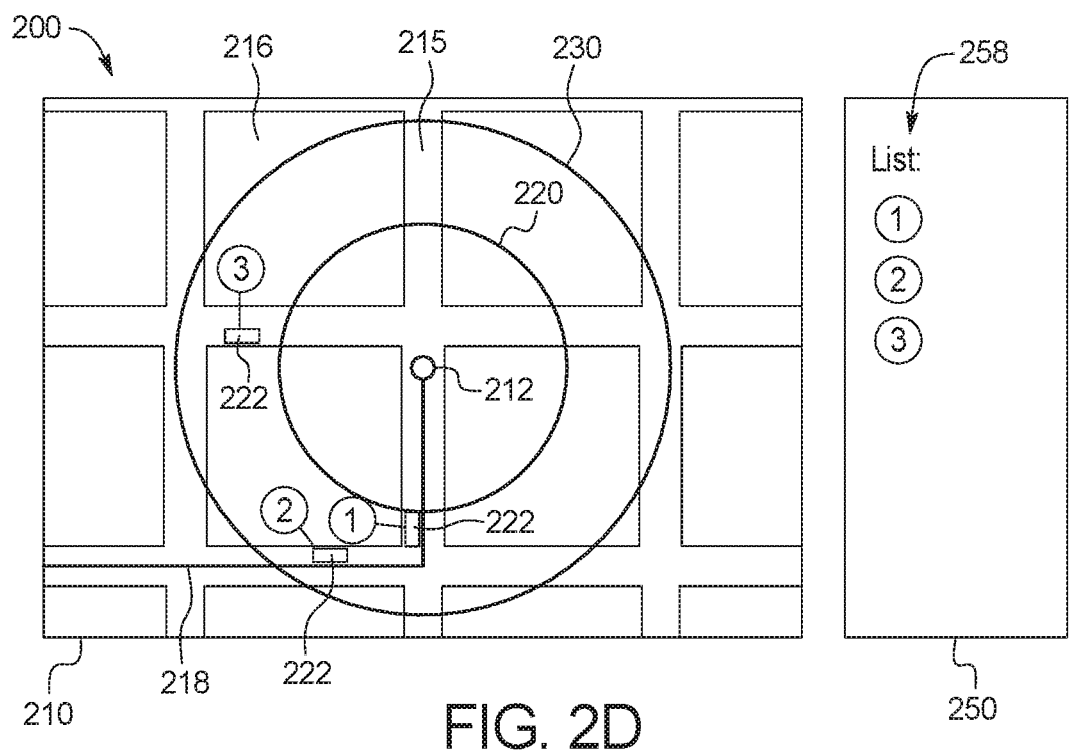

FIG. 2D illustrates an example display of a fourth example scenario. In the fourth scenario, the drone 110 has captured one or more images of one or more areas within the increased zone 230, and the park assist controller 156 has identified a plurality of unoccupied parking spots 222.

In the illustrated example, the first section 210 displays a detailed view of the zone 220 and the increased zone 230. The detailed view includes the destination 212, the current position 214 of the vehicle 100, the roads 215, the non-drivable areas 216, the vehicle route 218, the zone 220, unoccupied parking spots 222 and the increased zone 230.

Further, the second section 250 displays a list 258 including the unoccupied parking spots 222. The list 258 is sorted such that an unoccupied parking spot 222 proximate to the vehicle route 218 and closest to the destination 212 is provided as a first option.

FIG. 3 illustrates an example flowchart of a method 300 for operating the park assist controller 156 and the drone 110 of the vehicle of FIG. 1.

At block 302, the park assist controller 156 determines whether a user has provided a destination. If the destination is provided, the method 300 continues to block 304. Otherwise, the method 300 returns to block 302.

At block 304, the park assist controller 156 generates the vehicle route.

At block 306, the park assist controller 156 determines whether all required conditions are satisfied for activating the drone 110. For example, the park assist controller 156 may enable the drone 110 to take-off when: (1) an estimated time for the vehicle to arrive at the destination is less than a threshold time; (2) the vehicle is within a predetermined distance from the destination; (3) a velocity of the vehicle is less than a threshold velocity; and/or (4) weather data indicates a safe weather (e.g., no rain, wind velocity below a threshold, etc.). If the one or more conditions are satisfied, the method 300 continues to block 308. Otherwise, the method 300 returns to block 306.

At block 308, the park assist controller 156 determines the zone and the drone 110 route.

At block 310, the park assist controller 156 enables the drone 110 to take-off.

At block 312, the park assist controller 156 determines whether the user has activated the drone 110. If so, the method 300 continues to block 314. Otherwise, the method 300 returns to block 312.

At block 314, the drone 110 travels to the zone, captures one or more images of one or more areas in the zone based on the search pattern, and transmits the same to the vehicle.

At block 316, the park assist controller 156 analyzes the one or more captured images.

At block 318, the park assist controller 156 determines, based on the analysis, whether there is at least one unoccupied parking spot within the one or more captured images. If so, the method 300 continues to block 320. Otherwise, the method 300 continues to block 322.

At block 320, the park assist controller 156 generates a list of unoccupied parking spots based on an order. For example, the order may be based on, but not limited to: (1) the proximity of each of the unoccupied parking spots relative to the destination; (2) the vehicle's ETA to each of the unoccupied parking spots within the list; (3) the type of each unoccupied parking spot; and/or (4) the traffic within the area of each of the unoccupied parking spots.

At block 322, the park assist controller 156 prompts the user whether the zone should be increased and the drone 110 should perform a search based on the increased zone. If so, the method 300 continues to block 324. Otherwise, the method 300 terminates.

At block 324, the drone 110 travels to the increased zone, captures one or more images of one or more areas in the increased zone based on the search pattern, and transmits the same to the vehicle.

At block 326, the park assist controller 156 presents the list to the user.

At block 328, the park assist controller 156 determines whether the user has selected an unoccupied parking spot from the list.

At block 330, the park assist controller 156 generates a second route based on the selected unoccupied parking spot.

As mentioned previously, the second route refers to a route from the current position of the vehicle to the selected unoccupied parking spot.

At block 332, the drone 110 travels to the selected unoccupied parking spot.

At block 334, the drone 110 monitors the selected unoccupied parking spot and transmits, to the vehicle, one or more images of the selected unoccupied parking spot.

At block 336, the park assist controller 156 determines, based the one or more images of the selected unoccupied parking spot, whether the selected unoccupied parking spot is occupied. If so, the method 300 continues to block 342. Otherwise, the method 300 continues to block 338.

At block 338, the park assist controller 156 determines whether the vehicle has arrived at the selected unoccupied parking spot. If so, the method 300 continues to block 340.

At block 340, the park assist controller 156 instructs the drone 110 to return to the vehicle.

At block 342, the park assist controller 156 removes the selected previously unoccupied but now occupied parking spot from the list.

At block 344, the park assist controller 156 determines whether there is at least one unoccupied parking spot remaining in the list. If so, the method 300 returns to block 326. Otherwise, the method 300 returns to block 322.

Although the example steps are described with reference to the flowchart illustrated in FIG. 3, many other methods of implementing the park assist controller 156 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". As used here, the terms "module" and "unit" refer to hardware with circuitry to provide communication, control and/or monitoring capabilities, often in conjunction with sensors. "Modules" and "units" may also include firmware that executes on the circuitry. "Modules" and "units" may also refer to software and functions that could be located on shared or distributed hardware. The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a drone comprising a camera;
   a display; and
   processors configured to:
   receive an input indicating a destination;
   generate a zone including the destination;
   responsive to the vehicle's velocity being less than a threshold, enable the drone to take-off;
   cause the drone to capture images of the zone;
   identify an unoccupied parking spot from the images of the zone; and
   present the unoccupied parking spot on the display.

2. The vehicle of claim 1, wherein the processors are further configured to:
   responsive to failing to identify any unoccupied parking spot from the images of the zone:
   increase the zone;
   cause the drone to capture images of the increased zone; and
   identify any unoccupied parking spot from the images of the increased zone.

3. The vehicle of claim 1, wherein the processors are further configured to:
   determine the vehicle's estimated time for arrival (ETA) to the destination;
   responsive to the vehicle's ETA being lower than a threshold, enable the drone to take-off.

4. The vehicle of claim 1, wherein the processors are further configured to:
   generate one or more routes in which the drone is to traverse within the zone.

5. The vehicle of claim 1, wherein the processors are further configured to cause the drone to capture the images of the zone based on a priority.

6. The vehicle of claim 5, wherein the priority causes the drone to prioritize a search in an area within the zone based on a type of parking spaces available within the zone.

7. The vehicle of claim 1, wherein the processors are further configured to generate a list of unoccupied parking spots based on the images of the zone.

8. The vehicle of claim 7, wherein the processors are further configured to:
   responsive to selecting one of the unoccupied parking spots from the list, cause the drone to monitor the selected unoccupied parking spot; and
   when the selected unoccupied parking spot becomes unavailable, remove the selected unoccupied parking spot from the list.

9. The vehicle of claim 1, wherein the processors are further configured to:
   while the drone is activated:
   responsive to an amount of power remaining in the drone being less than a threshold, cause the drone to return to the vehicle.

10. A vehicle comprising:
    a drone comprising a camera;
    a display; and
    processors configured to:
    receive an input indicating a destination;
    generate a zone including the destination;
    cause the drone to capture images of the zone based on a priority;
    generate a vehicle route to the destination, and wherein the priority causes the drone to prioritize a search in an area within the zone based on proximity of the area relative to the vehicle route;
    identify an unoccupied parking spot from the images of the zone; and
    present the unoccupied parking spot on the display.

11. A method of operating a drone to identify at least one unoccupied parking spot for a vehicle, the method comprising:

receiving an input indicating a destination;
generating a zone including the destination;
responsive to the vehicle's velocity being less than a threshold, enabling the drone to take-off;
causing the drone to capture images of the zone;
identifying an unoccupied parking spot from the images of the zone; and
presenting the unoccupied parking spot.

12. The method of claim 11, further comprising:
responsive to failing to identify any unoccupied parking spot from the images of the zone:
increasing the zone;
causing the drone to capture images of the increased zone; and
identifying any unoccupied parking spot from the images of the increased zone.

13. The method of claim 11, further comprising:
determining the vehicle's estimated time for arrival (ETA) to the destination;
responsive to the vehicle's ETA being lower than a threshold, enabling the drone to take-off.

14. The method of claim 11, further comprising:
generating one or more routes in which the drone is to traverse within the zone.

15. The method of claim 11, further comprising:
causing the drone to capture the images of the zone based on a priority.

16. The method of claim 15, further comprising:
generating a vehicle route to the destination, and wherein the priority causes the drone to prioritize a search in an area within the zone based on proximity of the area relative to the vehicle route.

17. The vehicle of claim 15, wherein the priority causes the drone to prioritize a search in an area within the zone based on a type of parking spaces available within the zone.

18. The method of claim 11, further comprising:
generating a list of unoccupied parking spots based on the images of the zone.

* * * * *